United States Patent

Tatebayashi et al.

Patent Number: 6,151,394
Date of Patent: Nov. 21, 2000

[54] ENCRYPTED COMMUNICATION SYSTEM THAT LIMITS THE DAMAGE CAUSED WHEN A SECRET KEY HAS BEEN LEAKED

[75] Inventors: Makoto Tatebayashi, Takarazuka; Yoshihisa Fukushima, Osaka; Takehisa Kato, Yokohama; Naoki Endoh, Fuchu; Koichi Hirayama, Yokohama, all of Japan

[73] Assignees: Matsushita Electric Industrial Co., Ltd., Osaka-fu; Kabushiki Kaisha Toshiba, Kanagawa-ken, both of Japan

[21] Appl. No.: 08/940,052

[22] Filed: Sep. 30, 1997

[30] Foreign Application Priority Data

Oct. 31, 1996 [JP] Japan .................................. 8-290373

[51] Int. Cl.$^7$ ............................................ H04L 9/00

[52] U.S. Cl. ................... 380/283; 380/278; 380/277; 380/43

[58] Field of Search .................. 380/21, 1, 43, 380/44, 46, 260, 278, 283, 277

[56] References Cited

U.S. PATENT DOCUMENTS

| | | | |
|---|---|---|---|
| 4,197,502 | 4/1980 | Sumner et al. | 375/75 |
| 4,440,976 | 4/1984 | Bocci et al. | 179/1.5 R |
| 4,771,459 | 9/1988 | Jansen | 380/21 |
| 4,782,326 | 11/1988 | Bush | 341/76 |
| 5,390,247 | 2/1995 | Fischer | 380/25 |
| 6,009,174 | 12/1999 | Tatebayashi et al. | 380/277 |

*Primary Examiner*—Tod R. Swann
*Assistant Examiner*—Steve Kabakoff
*Attorney, Agent, or Firm*—Price and Gess

[57] ABSTRACT

In an encrypted transmission system composed of one transmission apparatus 10 and twenty-eight reception apparatuses A1–G4 that are classified into seven groups A–G, two secret key exclusively selected out of a total of fourteen secret keys are distributed beforehand to each group. The transmission apparatus 10 encrypts the same message M using one of the two secret keys distributed to each group and sends each group a message M encrypted with one of the group's secret keys. The reception apparatuses each decrypt the received cryptogram separately using each of the secret keys assigned to the of group to which each reception apparatus belongs, judge whether either of the two decryption results conforms to a predetermined rule, and specify the correct decryption result.

3 Claims, 8 Drawing Sheets

Fig. 7 ic text, audio, video, or programs via a transfer medium or recording medium, and in particular relates to a technique for encrypted transfer from a single transmission apparatus to a plurality of reception apparatuses using a secret key.

ENCRYPTED COMMUNICATION SYSTEM THAT LIMITS THE DAMAGE CAUSED WHEN A SECRET KEY HAS BEEN LEAKED

BACKGROUND OF THE INVENTION

1. Field of the Invention

The present invention relates to a system that performs encrypted transfer of data such as digitized text, audio, video, or programs via a transfer medium or recording medium, and in particular relates to a technique for encrypted transfer from a single transmission apparatus to a plurality of reception apparatuses using a secret key.

2. Description of the Related Art

In recent years, secret key encrypted communication systems have been developed which encrypt data such as digitized text, audio, video, or programs using a secret key, before transferring the data using a transfer medium or recording the data onto a recording medium for later reproduction. In such systems, both transmission apparatuses and reception apparatuses perform encryption and decryption using a predetermined secret key with which they are both provided.

When both transmission apparatuses and reception apparatuses are provided with a plurality of secret keys, it is necessary to specify which secret key is to be used before communication is commenced. This is performed to ensure that the reception apparatus will be able to decrypt the cryptogram transmitted by the transmission apparatus.

Conventional encrypted communication systems which are constructed so that one transmission apparatus supplies information to a plurality of reception apparatuses (hereinafter referred to as a "one-to-many" system) suffer from a major drawback in that when the secret key is leaked, it becomes necessary to set a new secret key in each reception apparatus, which requires the significant burden of changing the system construction itself.

As one example, when a secret key used by one broadcast station and one hundred reception apparatuses that receive programs transmitted by the broadcast station is leaked, it becomes necessary to change the secret key stored by the broadcast station and all one hundred reception apparatuses. This means that when the communication between one transmission apparatus and one reception apparatus is intercepted and the secret key decoded, this affects not just the two apparatuses involved in the intercepted communication, but every reception apparatus that is equipped with the same secret key.

SUMMARY OF THE INVENTION

In view of the stated problems, it is an object of the present invention to provide an encrypted communication system that makes it difficult for third parties to decode a secret key and that limits the damage caused to the system when a secret key is leaked.

In order to achieve the stated object, the encrypted communication system of the present invention is a communication system composed of one transmission apparatus and a plurality of reception apparatuses that are classified into a plurality of groups, with at least two out of a plurality of secret keys being exclusively distributed to each of the groups. In this system, the transmission apparatus selects one secret key for each group and uses the keys to encrypt a plaintext for each group, before transmitting the resulting cryptograms to the reproduction apparatuses in the respective groups. Each of the reproduction apparatuses uses the secret keys that have been distributed to the group to which it belongs to decrypt the received cryptogram and by judging whether any of the decrypted results conform to a predetermined rule, specifies a correct decrypted result.

With the stated construction, even if one of the secret keys is leaked or decoded, encrypted communication can be continued to the reproduction apparatuses in the groups which differ from the group with the leaked key. It is also possible to continue encrypted communication to the reproduction apparatuses in the group with the leaked key by using a different secret key for encryption. Since the transmission apparatus is free to change the secret key used for encrypted communication to any of the groups, it is not necessary to use the same secret key every time communication is performed to a given group, making it more difficult for a third party to decode the secret key.

In this way, an encrypted communication system that makes it difficult for third parties to decode a secret key and that limits the damage caused to the system when a secret key is leaked or decoded.

The transmission apparatus may append each cryptogram with another cryptogram showing the predetermined rule, and then transmit these to the reproduction apparatuses.

With the stated construction, the judging criteria by which a reproduction apparatus can specify a correct decrypted result from the plurality of decryption results by the reproduction apparatuses are encrypted by the transmission apparatus and sent to the reception apparatus, so that the information as to which secret key has been selected by the transmission apparatus is also kept concealed, making the encryption system highly secure.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

First Embodiment

The following is a detailed description of the encrypted communication system of the first embodiment of the present invention, with reference to the drawings. The present encrypted communication system is able to suppress the damage caused when the secret key is leaked or decoded.

Overview of the Encrypted Communication System

Figure 1:
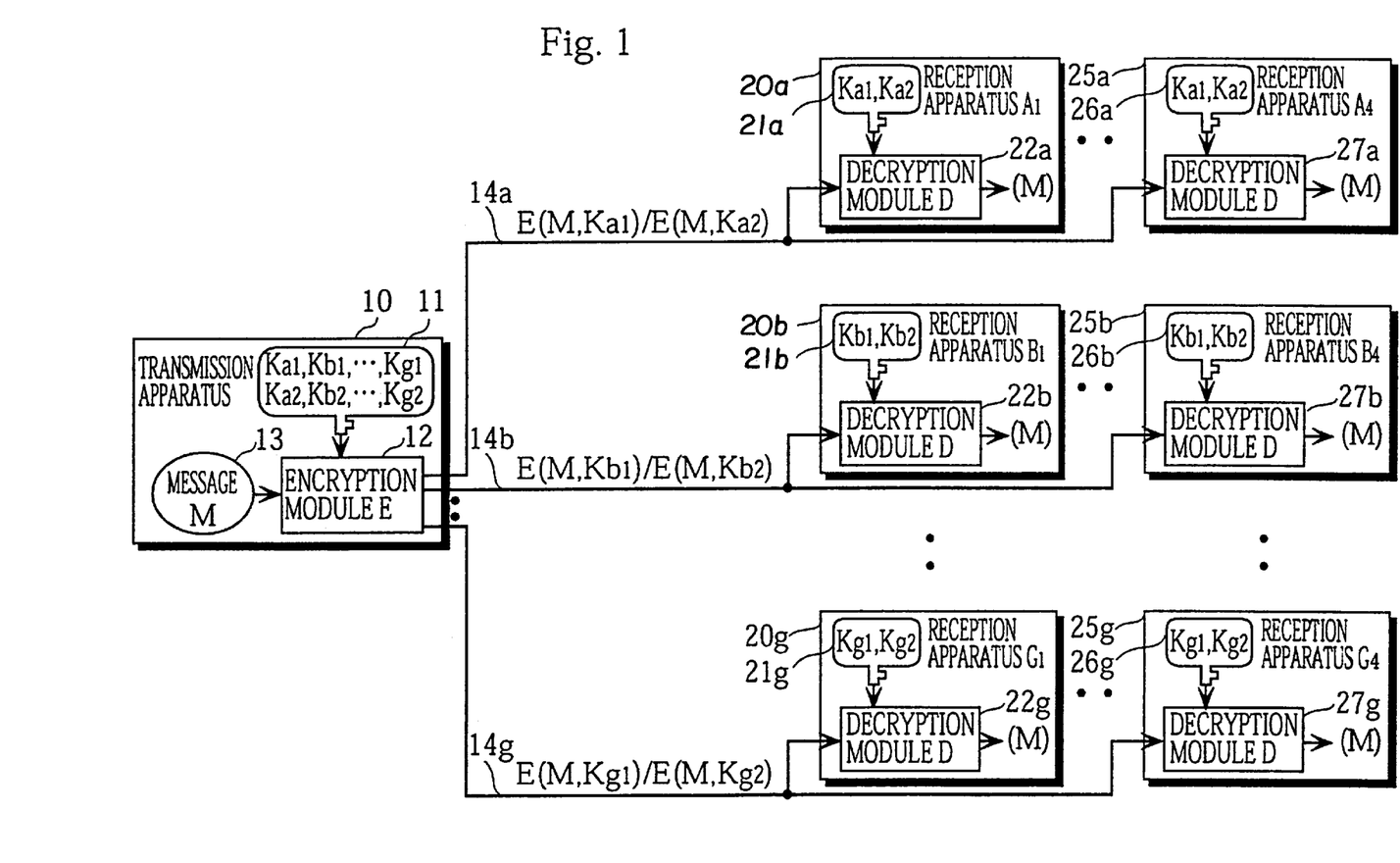
FIG. 1 shows the construction of the entire encrypted communication system or the first embodiment of the present invention and the basic principles of the encrypted communication.

FIG. 1 shows the system construction of the entire encrypted communication system of the first embodiment and the basic principles of the encrypted communication. As shown in FIG. 1, the present system is composed of one transmission apparatus 10 and twenty-eight reception apparatuses A1–C4 which receive transferred information that is one-directionally transferred from the transmission apparatus 10.

The twenty eight reception apparatuses A1–G4 each belong to one of seven groups A–G of four reception apparatuses. In more detail, the twenty-eight reception apparatuses A1 G4 are arranged so that the four reception apparatuses A1–A4 (of which only two have been shown in FIG. 1) which belong to group A are connected via the bus line 14a, the four reception apparatuses B1–B4 (of which only two have been shown in FIG. 1) which belong to group B are connected via the bus line 14b, . . . , and the four reception apparatuses G1–G4 (of which only two have been shown in FIG. 1) which belong to group G are connected via the bus line 14g.

The transmission apparatus 10 is equipped with a message 13 that is to be transmitted to all of the reception apparatuses A1–G4, fourteen different secret keys 11, and one encryption module 12. The transmission apparatus 10 is separately connected to seven bus lines 14a to 14g which it uses to perform transmission to each group, which is to say, to collectively transmit to four reception apparatuses.

The reception apparatuses A1–G4 are each composed of two secret keys 21a–21g . . . 26a–26g and one decryption module 22a–22g . . . 27a–27g corresponding to (which is to say, performing an inverse transformation to) the encryption module 12.

The object of the present system is to have the single transmission apparatus 10 transmit the same message M to the twenty-eight reception apparatuses A1 G4 by encrypted communication that uses secret keys.

The following explanation will first focus on the relation between the fourteen secret keys 11 provided in the transmission apparatus and the two secret keys provided in each reception apparatus.

In the present system, each of the seven groups A–G is exclusively assigned two secret keys out of the fourteen secret keys in the transmission apparatus 10, so that group A is assigned secret key Ka1 and Ka2, group B is assigned secret key Kb1 and Kb2, . . . , and group G is assigned secret key Kg1 and Kg2. These two secret keys assigned to each group are stored by each reception apparatus in the group. The transmission apparatus 10, meanwhile, stores the fourteen secret keys so as to correspond to the seven groups A–G to which they have been assigned. In short, the fourteen secret keys are distributed so that each reception apparatus has the same secret keys as other reception apparatuses in the same group, but different secret keys to reception apparatuses in other groups.

The following is an explanation of the specific content of the cryptograms transferred from the transmission apparatus 10 to the twenty-eight reception apparatuses A1–G4. These cryptograms transferred from the transmission apparatus 10 to the twenty-eight reception apparatuses A1–G4 are shown by the bus lines 14a to 14g in FIG. 1, with the notation "E(M,K)" showing a cryptogram obtained by subjecting the plaintext M to the encryption algorithm E using the encryption key K. In the same way, the notation "D(C,K)" shows the decrypted text obtained by subjecting the cryptogram C to the decryption algorithm D using the decryption key K.

As shown in FIG. 1, the transmission apparatus 10 transmits either the cryptogram E(M,Ka1) or the cryptogram E(M,Ka2) to the four reception apparatuses A1–A4 which belong to group A via the bus line 14a (shown in FIG. 1 as "E(M,Ka1)/E(M,Ka2)", either the cryptogram E(M,Kb1) or the cryptogram E(M,kb2) to the four reception apparatuses B1–B4 which belong to group B via the bus line 14b (shown in FIG. 1 as "E(M,Kb1)/E(M,Kb2)", . . . , and either the cryptogram E(M,Kg1) or the cryptogram E(M,Kg2) to the four reception apparatuses G1–G4 which belong to group G via the bus line 14g (shown in FIG. 1 as "E(M,Kg1)/E(M, Kg2)". In more detail, when transmitting to group A, the transmission apparatus 10 randomly selects one of the secret keys (Ka1 or Ka2) assigned to group A, has the encryption module 12 use the selected key to encrypt the message M, and collectively transmits the obtained cryptogram E(M, Ka1) or E(M,Ka2) to the four reception apparatuses A1–A4 in group A. In the same way, when transmitting to group B, the transmission apparatus 10 randomly selects one of the secret keys (Kb1 or Kb2) assigned to group B, has the encryption module 12 use the selected key to encrypt the message M, and collectively transmits the obtained cryptogram E(M,Kb1) or E(M,Kb2) to the four reception apparatuses B1–B4 in group B. By doing so, each group of reception apparatuses is sent a different cryptogram in order.

The reception apparatuses A1–G4 each decrypt the received cryptogram using the two secret keys with which they are provided and, if at least one of the resulting sets of decrypted data has a reliable content, each confirm that the decrypted data is the message M transferred from the transmission apparatus 10 and that the secret key used to obtain that decrypted data is the same as s secret key used by the transmission apparatus 10.

For the example of reception apparatus 20a, the received cryptogram is either E(M,Ka1) or E(M,Ka2). The reception apparatus 20d decrypts the received cryptogram separately using secret key Ka1 and secret key Ka2, and then determines whether at least one of the resulting two sets of decrypted data is reliable by judging whether the content of the decrypted data conforms to a predetermined rule. The details of this "predetermined rule" are given later in this specification.

As described above, the present encrypted communication system has one message M secretly transmitted from one transmission apparatus 10 to twenty-eight reception apparatuses 20a, with the system having the two major characteristics described below.

First, the present system has the advantage that if the secret keys distributed to one group are decoded by a third party, this will not affect the reception apparatuses in the other groups, so that there is no need to replace the secret keys in the other groups.

Second, two secret keys are distributed to each group, so that the secret key which is actually used will be a random selection of one or these keys. Accordingly, even if one of the secret keys distributed to a group is decoded by a third party, communication to the reception apparatuses in the same group can be continued without having to replace the secret keys if the other secret key distributed to the group is used thereafter.

Detailed Construction

Figure 2:
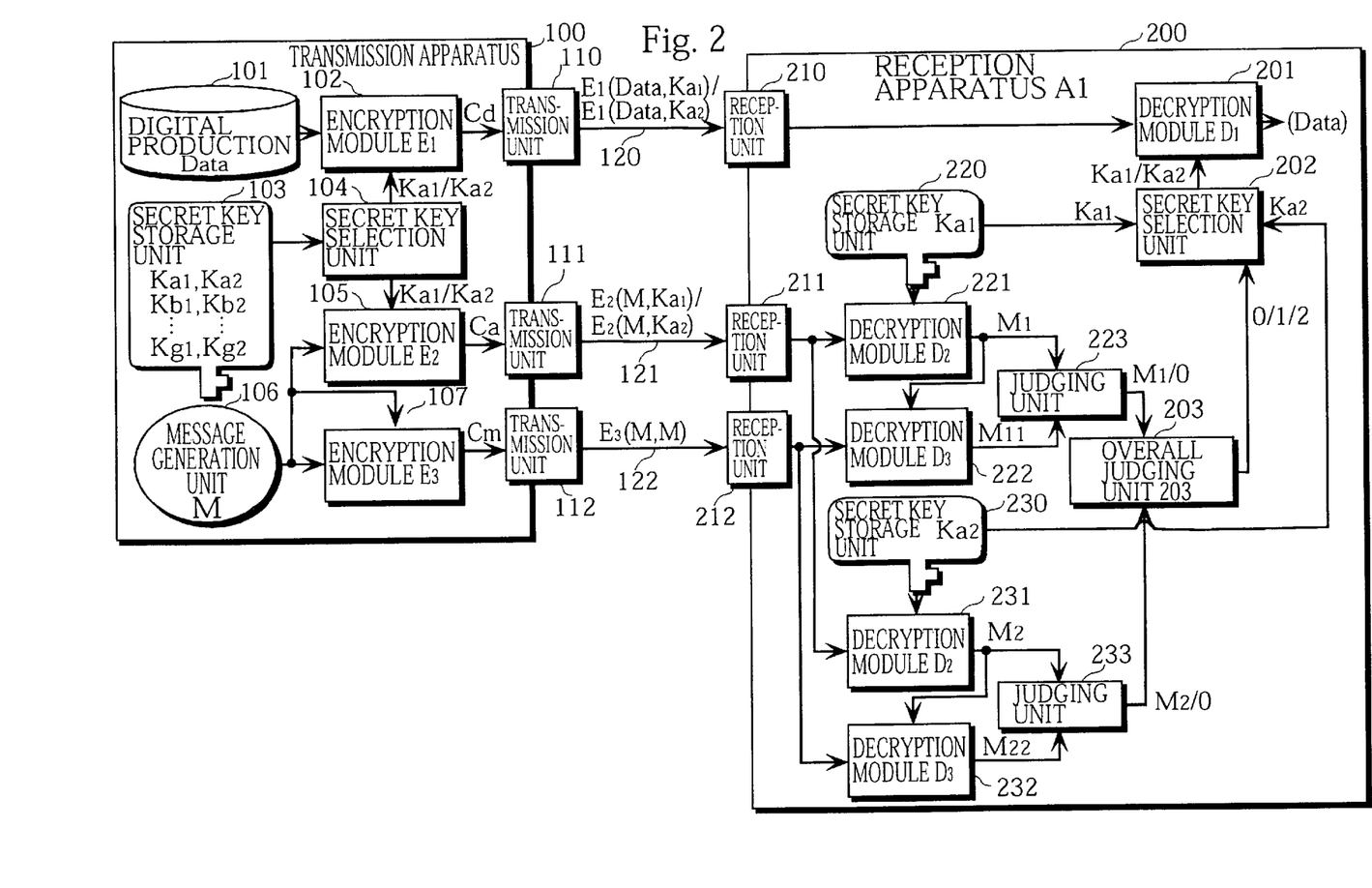
FIG. 2 is a block diagram showing the detailed construction and connection of the transmission apparatus 100 and one reception apparatus 200 in the present encrypted communication system.

FIG. 2 is a block diagram showing the detailed construction of the encrypted communication system shown in FIG. 1, focusing on the transmission apparatus 10 and one reception apparatus 20a.

The transmission apparatus 100 corresponds to the transmission apparatus 10 in FIG. 1, and is composed of a digital production 101, a secret key storage unit 103, a secret key selection unit 104, three encryption modules 102, 105, and 107, a message generation unit 106, and three transmission units 110–112.

The transmission apparatus 100 has the final object of encrypting the stored digital production 101 and transferring it to the reception apparatus A1. To do so, the transmission apparatus 100 transmits two kinds of cryptograms to the reception apparatus A1, namely, the cryptogram Ca for secretly informing the reception apparatus of the secret key that is used for encrypting the digital production and the cryptogram Cm for informing the reception apparatus of the predetermined rule used as the standard for specifying this secret key, in addition to the encrypted digital production Cd.

The digital production 101 can be realized by a hard disk drive, and stores data, such as a digitized text, audio, video, or a program.

The secret key storage unit 103 corresponds to the secret key in FIG. 1, and can be realized by a semiconductor memory which stores the fourteen secret keys so as to correspond to the groups A–G to which they are distributed.

Before any the three cryptograms described above are generated and transmitted, the secret key selection unit 104 randomly selects one of the two secret keys that correspond to the group to which a transmission destination reception apparatus belongs, and reads the selected secret key from the secret key storage unit 103. The secret key selection unit 104 then informs the two encryption modules 102 and 105 of the read secret key. For the specific example of when the transmission destination is reception apparatus A1, the secret key selection unit 104 selects one out of secret key Ka1 and secret key Ka2, reads it from the secret key storage unit 103, and sends it to the encryption modules 102 and 105.

The encryption module 102 can be an integrated circuit (IC) that performs encryption based on a secret encryption algorithm E1. The encryption module 102 reads a one block unit of the digital data "Data" from the digital production 101, encrypts the data using the secret key Ka1 and Ka2 sent from the secret key selection unit 104, and transfers the obtained cryptogram Cd(=E1(Data,Ka1)/E1(Data,Ka2)) to the transmission unit 110. The encryption module 102 repeats this processing for all of the data in the digital production 101.

The message generation unit 106 corresponds to the message 13 in FIG. 1, and can be realized by a random number generator that generates a random number that is different for each transmission destination group and stores it as the message M. It should be noted that in the present embodiment, the message M is dummy data that is used as the carrier for informing the reproduction apparatus A1 of the secret key used for the encryption of the digital production 101. Accordingly, the content of this message M is not especially important.

The encryption module 105 is an integrated circuit (IC) that performs encryption based on a secret encryption algorithm E2. The encryption module 105 reads the message M stored in the message generation unit 106, encrypts it using the secret key Ka1 or Ka2 sent from the secret key selection unit 104, and transfers the obtained cryptogram Ca)=E2(M,Ka1)/(E2(M,Ka2)) to the transmission unit 111.

The encryption module 107 can be an integrated circuit (IC) that performs encryption based on a secret encryption algorithm E3. The encryption module 107 reads the message M stored in the message generation unit 106, encrypts it using the message itself, and transfers the obtained cryptogram (Cm(=E3(M,M)) to the transmission unit 112.

The transmission units 110, 111, and 112 can each be composed of a parallel-to-series convertor and an amplifier, and are respectively used to transmit the cryptograms Cd, Ca, and Cm to the reception apparatus A1 via the bus lines 120, 121, and 122. It should be noted here that these three bus lines 120, 121, and 122 collectively correspond to the single bus line 14a shown in FIG. 1.

The reproduction apparatus A1 corresponds to the reproduction apparatus 20a shown in FIG. 1 and is composed of five decryption modules 201, 221, 222, 231, and 232, two secret key storage units 220 and 230, two judging units 223 and 233, an overall judging unit 203, a secret key selection unit 202, and three reception units 210–212.

The reproduction apparatus has a final object of decrypting and using the encrypted digital production transmitted by the transmission apparatus 100. Here, the secret key to be used in the decryption, which is to say the secret key which was used by the transmission apparatus 100, is specified from the two kinds of cryptogram Ca and Cm that are transmitted together with the encrypted digital production Cd.

The reception units 210, 211, and 212 can each be composed of a series-to-parallel convertor, and are respectively used to receive the three kinds of cryptogram Cd, Ca, and Cm from the bus lines 120, 121, and 122.

The decryption module 201 can be composed of an IC for performing decryption based on the secret decryption algorithm D1 that is the inverse transformation of the encryption algorithm E1 of the encryption module 102 in the transmission apparatus 100. When given a secret key Ka1 or Ka2 by the secret key selection unit 202, the decryption module 201 uses the secret key to decrypt the cryptogram Cd sent from the reception unit 210, and by doing so restores the block data "Data" of the original digital production.

It should be noted here that the decryption module 201 only repeats its decryption so long as the encrypted digital production Cd is being repeatedly sent from the transmission apparatus 100. When it has not been given a secret key by the secret key selection unit 202, the decryption module 201 judges that the specifying of the secret key has failed and so does not attempt to decrypt the encrypted digital production.

The secret key storage unit 220, the decryption module 221, the decryption module 222, and the judging unit 223 form one subcircuit whose object is to judge whether the secret key used by the transmission apparatus 100 is secret key Ka1. In the same way, the secret key storage unit 230, the decryption module 231, the decryption module 232, and the judging unit 233 form one subcircuit whose object is to judge whether the secret key used by the transmission apparatus 100 is secret key Ka2. These two subcircuits are identical in construction and function, with the only difference being in the secret key stored in the secret key storage unit 220 and in the secret key storage unit 230. Accordingly, only one of these subcircuits will be described.

The secret key storage unit 220 corresponds to the secret key 21a shown in FIG. 1, and can be composed of semiconductor memory that stores the secret key Ka1.

The decryption module 221 can be composed of an IC for performing decryption based on the secret decryption algorithm D2 that is the inverse transformation of the encryption algorithm E2 of the encryption module 105 in the transmission apparatus 100, and corresponds to the decryption module 22a shown in FIG. 1. This decryption module 221 decrypts the cryptogram Ca sent from the transmission unit 211 using the secret key Ka1 read from the secret key storage unit 220, and sends the obtained decrypted data M1=D2(Ca,Ka1) to the judging unit 223 and the decryption module 222.

The decryption module 222 can be composed of an IC for performing decryption based on the secret decryption algorithm D3 that is the inverse transformation of the encryption algorithm E3 of the encryption module 107 in the transmission apparatus 100. This decryption module 222 decrypts the cryptogram Cm sent from the reception unit 212 and sends the obtained decrypted data M11=D3(Cm,M1) to the judging unit 223.

The judging unit 223 can be composed of a comparator and a selector, and judges whether the decrypted data M1 sent from the decryption module 221 matches the decrypted data M11 sent from the decryption module 222. When the two sets of decrypted data match, the judging unit 223 sends the decrypted data M1 to the overall judging unit 203, or otherwise sends the data "0" to the overall judging unit 203.

Here, the case where the two sets of decrypted data match (M1=M11) corresponds to the case where the secret key selected by the transmission apparatus 100 is secret key Ka1. The reasoning behind this is explained below.

Suppose that the secret key selection unit 101 in the transmission apparatus 100 has selected secret key Ka1. In such case, $$Ca-E2(M, Ka1) \quad \text{Equation (1)}$$

$$Cm=E3(M,M) \quad \text{Equation (2)}$$

As a result, the decrypted data M1 outputted by the decryption module 221 of the reception apparatus A1 can be rearranged using the relation given in Equation (1) above.

$$M1=D2 \ (ca, Ka1) =D2 \ (E2(M, Ka1), Ka1) =M \quad \text{Equation (3)}$$

On the other hand, the decrypted data M11 outputted by the decryption module 22 of the reception apparatus A1 can be rearranged using the relations given in Equations (2) and (3) above.

$$M11=D3 \ (Cm, M1) =D3 \ (E3(M,M), M) =M \quad \text{Equation (4)}$$

From Equations (3) and (4) above:

$$M1=M11 \quad \text{Equation (5)}$$

It should be noted here that the judging unit 233 in the other subcircuit similarly judges whether the decrypted data M2 sent from the decryption module 231 matches the decrypted data M22 sent from the decryption module 232. When the two sets of decrypted data match, the judging unit 233 sends the decrypted data M2 to the overall judging unit 203, or other wise sends the data "0" to the overall judging unit 203.

The overall judging unit 203 can be composed of a logical OR circuit and a selector, and, based on the decrypted data outputted by the judging unit 223 and the judging unit 223, sends a specification of the secret key (either Ka1 or Ka2) which should be used for the decryption of the encrypted digital production Cd sent from the transmission apparatus 100 to the secret key selection unit 202, or otherwise sends an indication that a decryption key cannot be identified to the secret key selection unit 202.

More specifically, when the output of the judging unit 223 is the decrypted data M1 and not the value "0", the overall judging unit 203 sends an indication "1", showing that secret key Ka1 is selected, to the secret key selection unit 202, regardless of the output of the judging unit 233. When the output of the judging unit 223 is "0" and the output of the judging unit 233 is the decrypted data M2 and not the value "0", the overall judging unit 203 sends an indication "2", showing that secret key Ka2 is selected, to the secret key selection unit 202. In all other cases, the overall judging unit 203 sends the value "0" to the secret key selection unit 202 showing that a decryption key could not be identified.

The secret key selection unit 202 can be composed of a selector, and, depending on whether the output of the overall judging unit 203, is "0", "1", or "2", does not output a secret key to the decryption module 201, outputs the secret key Ka1 to the decryption module 201, or outputs the secret key Ka2 to the decryption module 201. This secret key selection unit 202 maintains its output while the blocks of the encrypted digital production Cd are being repeatedly transmitted from the transmission apparatus 100.

The preceding description states that the judging unit 223 (233) outputs "0" when the decrypted data M1 (M2) and the decrypted data M11 (M22) do not match, with the overall judging unit 203 processing the secret key Ka1 (Ka2) related to the unsuccessful match as not being the secret key selected by the transmission apparatus 100. This is possible due to the following characteristic exhibited by the encryption (decryption) algorithm used by the present system. This characteristic is that decrypted text obtained when a cryptogram is decrypted with a secret key which is not the proper decryption key will always differ from the original plaintext.

Operation of the Encrypted Communication System

The following is a description of the operation of the encrypted communication system whose construction is explained above.

Figure 3:
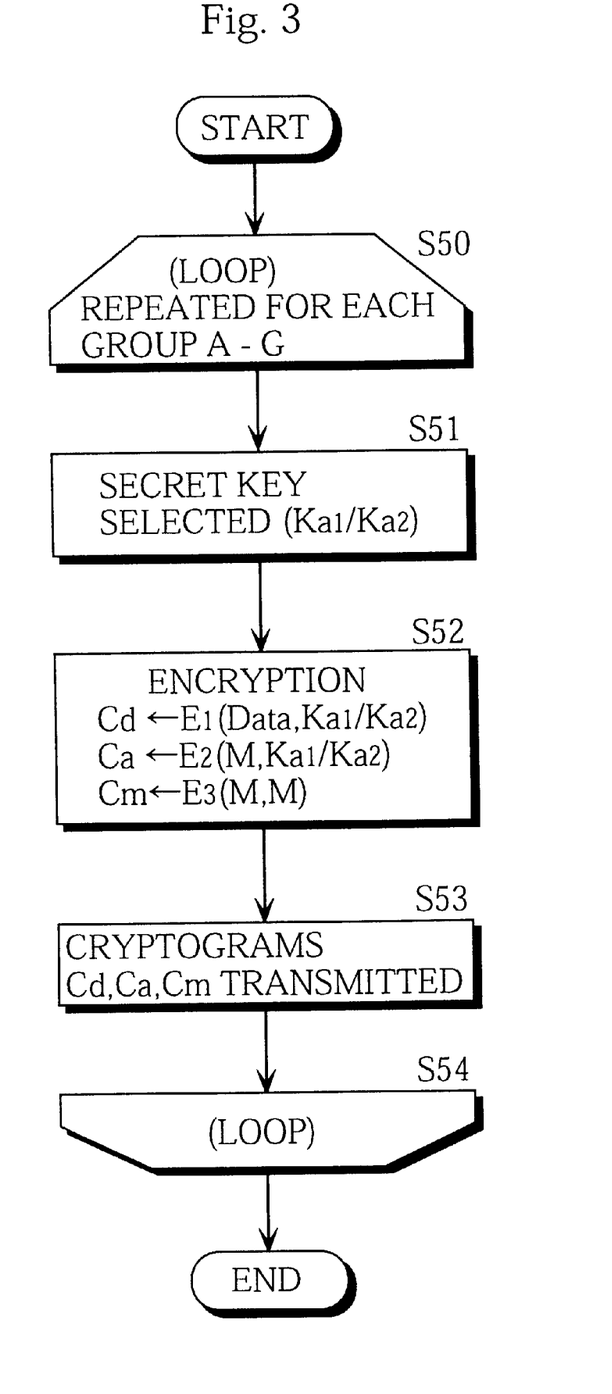
FIG. 3 is a flowchart showing the operation of the transmission apparatus 100.

FIG. 3 is a flowchart for the operation of the transmission apparatus 100. This transmission apparatus 100 repeats the processing described below (steps S51 to S53) for the seven groups A–G (steps S50 to S54). It should be noted here that the symbols and equations given in steps S51 to S53 indicate the processing performed for group A, with only the processing for group A being explained below.

First, the secret key selection unit 104 randomly selects one of the two secret keys Ka1 and Ka2 corresponding to group A and sends it to the encryption module 102 and the encryption module 105 (step S51).

The encryption module 102 uses the secret key Ka1/Ka2 selected in step S51 to encrypt the block data "Data" of the digital production 101, thereby generating the cryptogram Cd. The encryption module 105 uses the same secret key Ka1/Ka2 selected in step S51 to encrypt the message M generated by the message generation unit 106 to generate the cryptogram Ca. Meanwhile, the encryption module 107 encrypts the message M using the message M itself as the secret key, thereby generating the cryptogram Cm (Step S52). Note that these three encryption processes are performed in parallel.

The three transmission units 110, 111, and 112 then collectively transmit the three cryptograms Cd, Ca, and Cm generated in Step S52 to the four reception apparatuses A1–A4 belonging to group A via the bus lines 120, 121, and 122.

On completing the transmission to group A, the transmission apparatus 100 performs the same transmission processing for group B, and then for the other remaining groups C–G (Steps S50–S54).

Figure 4:
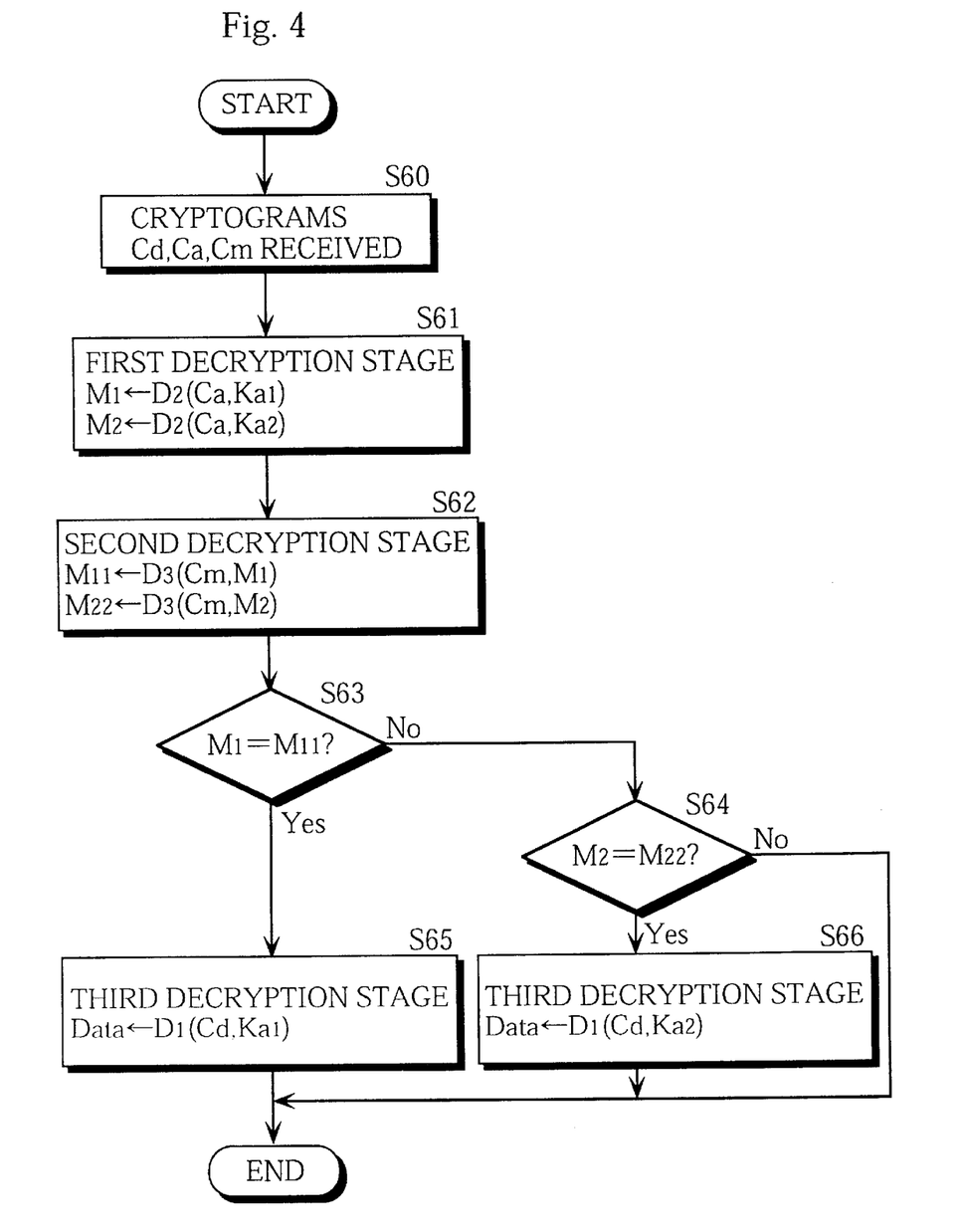
FIG. 4 is a flowchart showing the operation of the reception apparatus A1.

FIG. 4 is a flowchart showing the operation of the reception apparatus A1. It should be noted here that the operation of the other reception apparatuses A2–G4 is fundamentally the same as that shown in this figure.

First, the reception units 210, 211, and 212 receive the three cryptograms Cd, Ca, and Cm transmitted from the transmission apparatus 100 via the three bus lines 120, 121, and 122, and send the received cryptograms to the decryption module 201, the decryption module 221, the decryption module 231 (Step S60).

In the first decrypting stage, the decryption module 221 decrypts the cryptogram Ca sent from the reception unit 211 using the secret key Ka1 read from the secret key storage unit 220 to generate the decrypted data M1, at the same time as the decryption module 231 decrypts the cryptogram Ca sent from the reception unit 211 using the secret key Ka2 read from the secret key storage unit 230 to generate the decrypted data M2 (Step S61).

In the second decrypting stage, the decryption module 222 decrypts the cryptogram Cm received from the reception unit 212 using the decrypted data M1 generated by the decryption module 221 as the decryption key to generate the decrypted data M11, while in parallel the decryption module 232 decrypts the cryptogram Cm received from the reception unit 212 using the decrypted data M2 generated by the decryption module 222 as the decryption key to generate the decrypted data M22 (Step S62).

The judging unit 223 judges whether the decrypted data M1 generated by the decryption module 222 matches the decrypted data M11 generated by the decryption module 223 and, when the data matches, outputs the decrypted data M1 to the overall judging unit 203, or otherwise outputs "0" to the overall judging unit 203. Concurrently, the judging unit 233 judges whether the decrypted data M2 generated by the decryption module 231 matches the decrypted data M22 generated by the decryption module 232 and, when the data matches, outputs the decrypted data M2 to the overall judging unit 203, or otherwise outputs "0" to the overall judging unit 203 (Steps S63, S64).

On receiving an indication of a match (the decrypted data M1) from the judging unit 223, the overall judging unit 203 gives this indication priority over any indication from the judging unit 233 and so gives an indication "1" to the secret key selection unit 202 indicating a selection of the secret key Ka1. As a result, the decryption module 201 uses the secret key Ka1 sent from the secret key selection unit 202 to decrypt the cryptogram Cd sent from the transmission unit 210 into the original "Data" of the digital production (Step S65).

On the other hand, when the overall judging unit 203 has received an indication "0" from the judging unit "0" showing that there has not been a match, the overall judging unit 203 judges the content of the indication sent from the judging unit 233 and, on finding that the indication is for a match (the decrypted data M2), the overall judging unit 203 gives an indication "2" to the secret key selection unit 202, indicating a selection of the secret key Ka2. As a result, the decryption module 201 uses the secret key Ka2 sent from the secret key selection unit 202 to decrypt the cryptogram Cd sent from the transmission unit 210 into the original "Data" or the digital production (Step S66).

When both the judging unit 223 and the judging unit 233 send indications "0" showing that there has not been a match, the overall judging unit 203 gives an indication "0" to the secret key selection unit 202. As a result, the decryption module 201 does not decrypt the cryptogram Cd sent from the reception unit 210 (Step S66).

As described above, the present invention has two out of a total of fourteen secret keys exclusively distributed to each of the seven groups, with the transmission apparatus 100 using one of the secret keys for each group to perform encryption, meaning that the digital production 101 and the message M can be secretly transmitted to each of the twenty-eight reception apparatuses A1–G4.

With the above arrangement, even if an unauthorized third party repeatedly intercepts the bus line 14a and decodes one of the secret keys Ka1, communication may be continued to the other reception apparatuses in groups B–G which use completely different secret keys. The transmission apparatus 10 is also able to use the secret key Ka2 instead of the decoded secret key Ka1 for transmitting to group A, so that the communication to the reception apparatuses in group A may also be continued.

Pulling this into other words, even if one of the secret keys is leaked or decoded, there is no need to update the secret keys stored by the transmission apparatus and all of the reception apparatuses, or to distribute new secret keys to all of the reception apparatuses. As a result, secret communication can be continued without modification of the system.

The encrypted communication system of the present invention has been described using the embodiment given above, although it should be obvious that the scope of the present invention is not limited to this embodiment. Several possible modifications have been listed below.

(1) The present embodiment describes the case where the encrypted communication system is a star network where one transmission apparatus transmits different cryptograms to each reception apparatus, although the present invention need not be this kind of network. It is equally possible for the invention to be realized by a bus network where one transmission apparatus and a plurality of reception apparatuses are attached to one coaxial cable, with the single transmission apparatus collectively supplying a set of cryptograms to all of the reception apparatuses.

(2) The communication medium in the encrypted communication system of the present embodiment was described as a collection of bus lines 14a–14g, although a recording medium such as a CD-ROM may be used.

Figure 5:
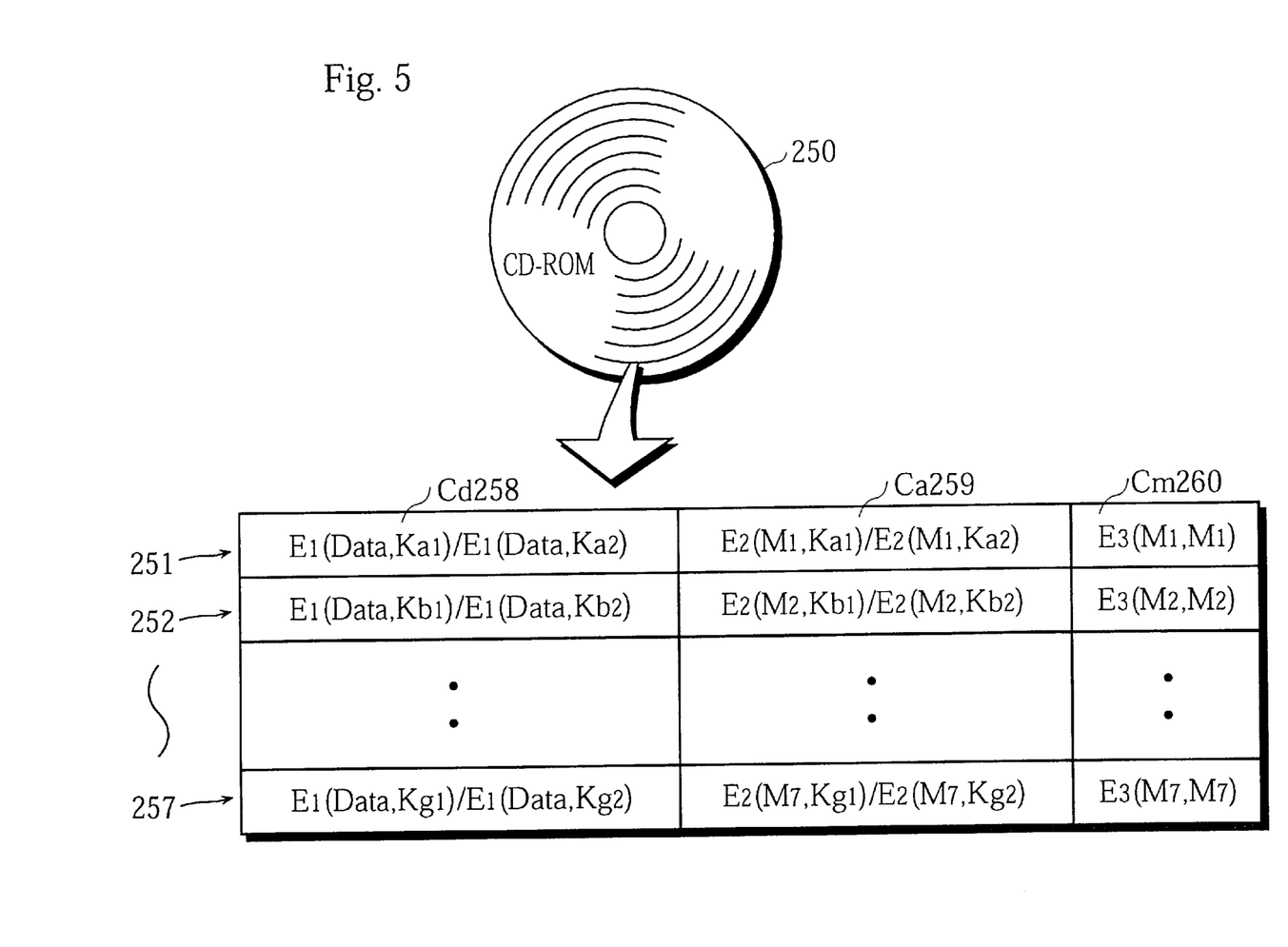
FIG. 5 shows the content written onto a recording medium when the communication medium of the encrypted communication system of the present invention is a recording medium.

FIG. 5 shows the content of the CD-ROM 250 which is written by a transmission apparatus when the communication medium of the encrypted communication system of the present invention is a CD-ROM 250.

This system can be arranged so that a transmission apparatus (CD-ROM writer) records three cryptograms Cd258, Ca259, and Cm260 for each of the seven groups or reception apparatuses at each of the seven recording position 251–257 that correspond to the respective groups. On the other hand, the reception apparatuses (CD-ROM drives) each read the three cryptograms Cd258, Ca259, and Cm260 recorded at the recording position that corresponds to the group to which the reception apparatus belongs, and decrypts the digital production "Data".

(3) In the present embodiment, three different encryption algorithms were used, although a same encryption algorithm may be used. It is also possible to achieve the plurality of secret key storage units and the plurality of encryption/decryption modules with a circuit that is provided on one semiconductor IC.

(4) In the present embodiment, the secret key selection unit 104 was described as selecting the secret key at random, although other selection methods are also possible, so that the secret key may be selected in accordance with predetermined priority rankings. In such case, the system can be made to select a different secret key when a first secret key has been decoded.

(5) In the present embodiment, two secret keys are distributed to each group and encryption is performed by selecting and using one of these secret keys, although a different number of keys may be distributed. As one example, the transmission apparatus 100 may generate a cryptogram using a secret key that is a combination (found, for example, by taking a logical XOR for each bit position) of three secret keys selected out of four secret keys that are distributed to each group. The reception apparatuses then decrypt the cryptogram using a variety or decryption keys obtained by taking a logical XOR for each bit position of every combination of three secret keys selected out of the four secret keys, and perform the same judgement as the present embodiment for each of the decryption results. Here, if the decrypted data Mn and Mnn match for at least one combination of decryption keys, the reception apparatus may judge that the matching combination of decryption keys is the combination selected by the transmission apparatus 100.

(6) In present embodiment, groups made up of two or more reception apparatuses were described, although each group may only include one reception apparatus. In such case, each reception apparatus may be provided with two or more secret keys, and the transmission apparatus may transmit cryptograms to reception apparatuses that have been generated using different secret keys for each reception apparatus.

Second Embodiment

The following is a description of the encrypted communication system of the second embodiment of the present invention, with reference to the drawings. The present encrypted communication system is characterized by performing a three-stage encryption process.

Construction of the Encrypted Communication System

Figure 6:
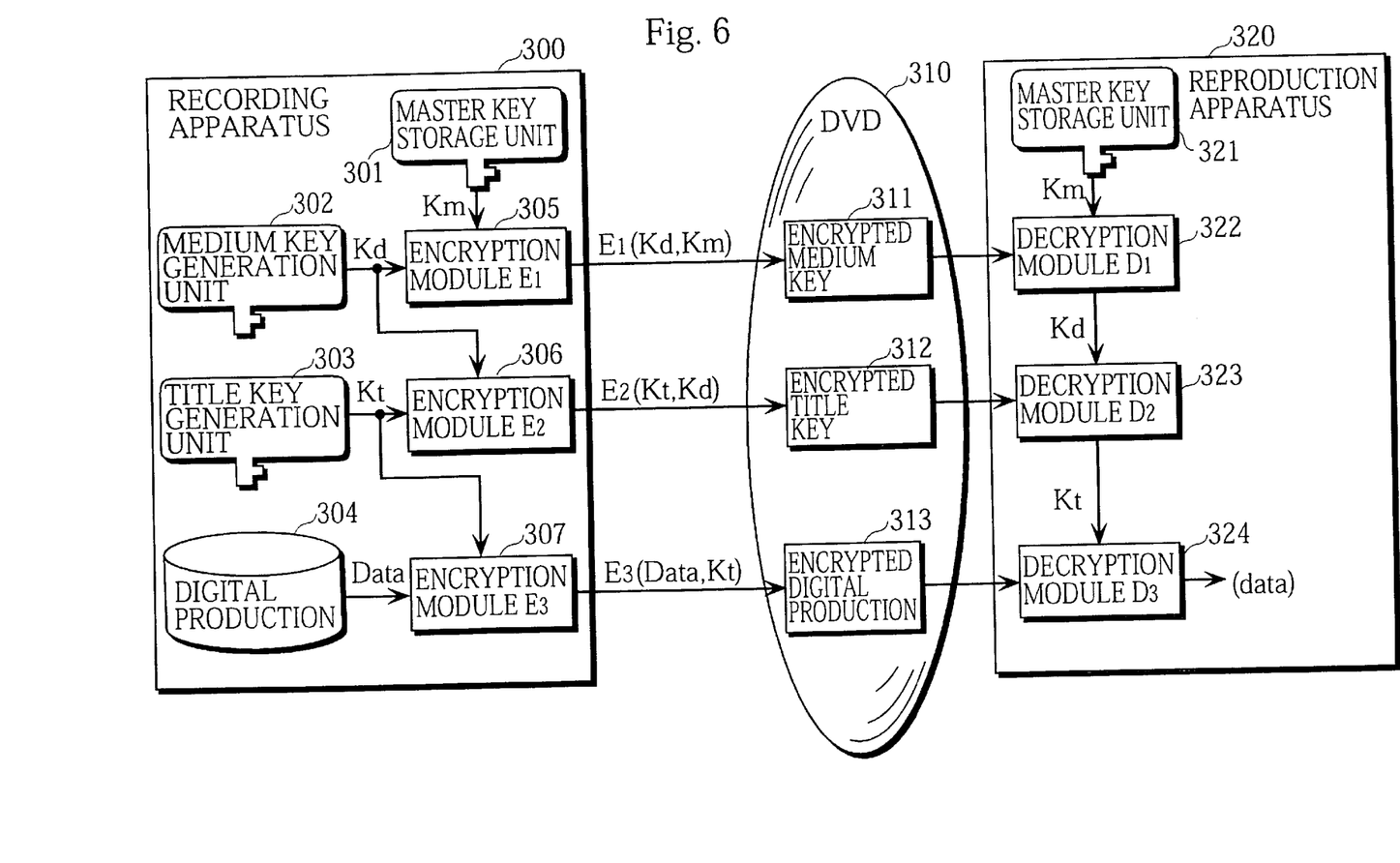
FIG. 6 shows the construction of the entire encrypted communication system of the second embodiment of the present invention and the basic principles of the encrypted communication.

FIG. 6 shows the entire construction of the encrypted communication system and the fundamental principles of the encrypted communication in the second embodiment. As shown in the drawing, the present system is an encrypted communication system that aims to protect the copyright of a digital production using a three-stage encryption process, and is composed of a recording apparatus 300 and a reproduction apparatus 320 for a DVD (Digital Video Disc) 310.

The recording apparatus 300 is an apparatus for recording digital data onto the DVD 310, and is composed of a master key storage unit 301, a medium key generation unit 302, a title key generation unit 303, three kinds of encryption module 305–307, and a digital production 304 which stores digital data, such as text, images, and audio.

The master key storage unit 301 stores a master key Km that is a secret key commonly owned by authorized (permitted to perform reproduction) reproduction apparatuses 320. The medium key generation unit 302 generates a medium key Kd that is a secret key for distinguishing each DVD 310. The title key generation unit 303, meanwhile, generates a title key Kt that is a secret key assigned to one title (for example, a movie) out of the digital production 304 recorded on the DVD 310.

The three encryption modules 305–307 respectively encrypt the medium key Kd, the title key Kt, and the digital production "Data" using three different encryption algorithms E1, E2, and E3, and by doing so generates the encrypted medium key 311, the encrypted title key 312, and the encrypted digital production 313.

The reproduction apparatus 320 is an authorized apparatus which reads and decodes the encrypted digital production 313 from the DVD 310 recorded by the recording apparatus 300. The reproduction apparatus 320 includes a master key storage unit 321 for storing the same master key Km as the master key storage unit 301 in the recording apparatus 300, and three decryption modules 322–324.

The three decryption modules 322–324 decrypt the encrypted medium key 311, the encrypted title key 312, and the encrypted digital production 313 read from the DVD 310 based on the secret decryption algorithm D1, D2, and D3 which are the inverse transformations of the encryption algorithms E1, E2, and E3 provided in the recording apparatus 300.

Operation of the Encrypted Communication System

The following is an explanation of the operation of the encrypted communication system described above, with reference to FIG. 6.

The recording apparatus 300 performs encryption in the three stages described below. The encryption module 305 generates the encrypted medium key E1(Kd,Km) 311 by encrypting the medium key Kd generated by the medium key generation unit 302 using the master key Km read from the master key storage unit 301 as the encryption key. The encryption module 306 generates the encrypted title key E2 (Kt,Kd) 312 by encrypting the title key Kt generated by the title key generation unit 303 using the medium key Kd as the encryption key. Finally, the encryption module 307 generates the encrypted digital production E3 (Data,Kt) 313 by encrypting the digital production "Data" 304 using the title key Kt as the encryption key.

The generated encrypted medium key E1(Kd, Km) 311, the encrypted title key E2 (Kt,Kd) 312, and the encrypted digital production E3 (Data,Kt) 313 are recorded onto the DVD 310 at predetermined locations by the recording apparatus 300.

The reproduction apparatus 320, on the other hand, performs decryption in the three stages described below.

After the encrypted medium key E1(Kd,Km) 311, the encrypted title key E2 (Kt,Kd) 312, and the encrypted digital production E3 (Data,Kt) 313 have been read from the DVD 310 by the reproduction apparatus 320, the decryption module 322 first decrypts the encrypted medium key E1(Kd, Km) 311 using the master key Km read from the master key storage unit 321 as the decryption key to generate the medium key Kd. This is shown by Equation 6 below.

$$Kd = D1 \ (E1(Kd,Km),Km) \qquad \text{Equation (6)}$$

Following this, the decryption module 323 decrypts the encrypted title key E2 (Kt,Kd) 312 using the medium key Kd generated by the decryption module 322 to generate title key Kt. This is shown by Equation 7 below.

$$Kt = D2 \ (E2(Kt,Kd),Kd) \qquad \text{Equation (7)}$$

Finally, the decryption module 324 decrypts the encrypted digital production E3 (Data,Kt) 313 using the title key Kt generated by the decryption module 323 as the decryption key to generate the digital production "Data". This is shown by Equation 8 below.

$$Data = D3 \ (E3(Data, Kt),Kt) \qquad \text{Equation (8)}$$

When the master key Km provided in the reproduction apparatus 320 does not match the master key Km provided in the recording apparatus 300, the key generated by the decryption module 322 will not match the title key generated by the title key generation unit 303 in the recording apparatus 300. As a result, even if the decryption in the following two stages is performed, the data outputted from the decryption module 324 will not match the original digital production "Data" 304. This is to say, only reproduction apparatuses 304 which are provided with the same master key Km as the recording apparatus 300 will be able to restore the digital production 304 to its original state.

As described above, the present encrypted communication system encrypts the digital production 304 and records it onto the DVD 310, with the decryption and reproduction of the encrypted digital production 313 only being possible by reproduction apparatuses 320 that possess the master key Km. A medium key Kd that is unique to each DVD 310 and a title key Kt that is unique to each title are also encrypted and recorded onto the DVD 310, so that only by successfully decrypting these in order will the reproduction apparatus 320 be able to successfully decode the digital production "Data" for a specified title.

As a result, in addition to preventing leaks of the encryption key and dead copying which are possible when all of the encryption keys are provided on the recording medium, the present invention uses a master key that is only distributed to manufacturers or authorized apparatuses, thereby facilitating the distinction between authorized reproduction apparatuses that can reproduce contents and non-authorized apparatuses that cannot.

Third Embodiment

Figure 7:
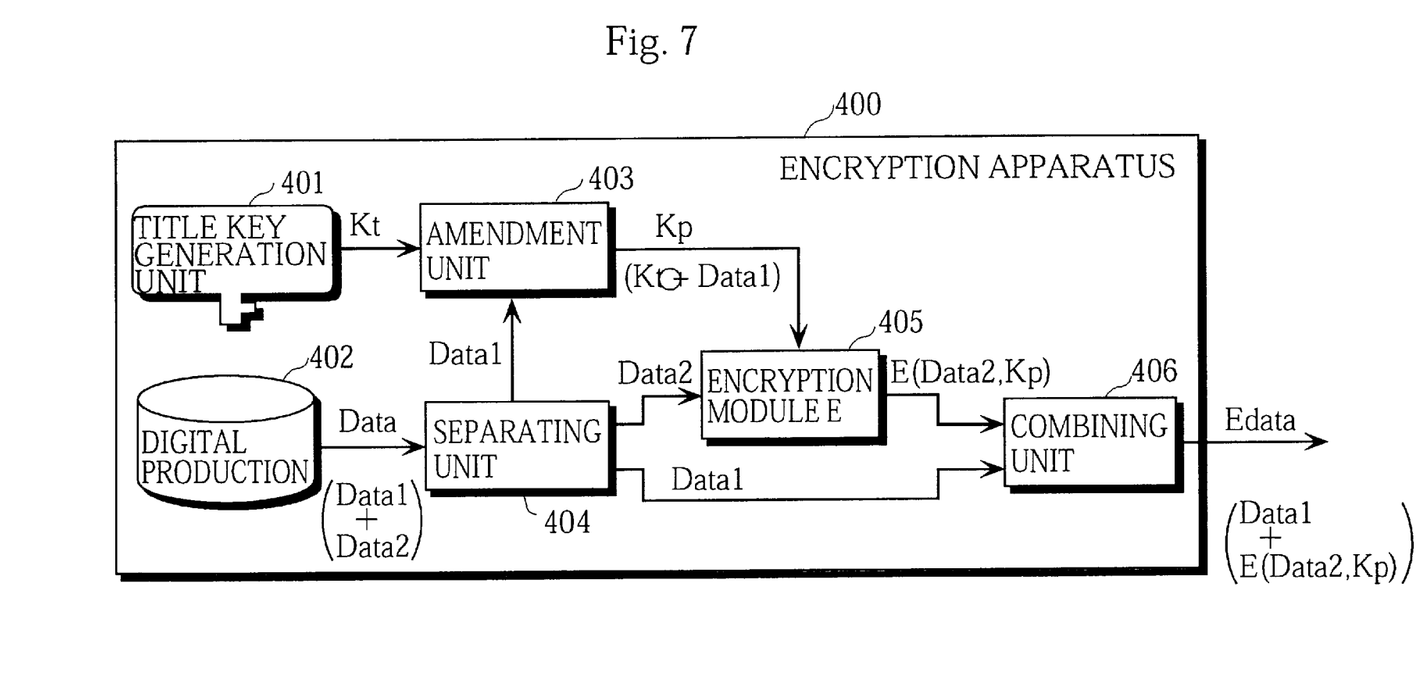
FIG. 7 is a block diagram showing the construction of the encryption apparatus of the third embodiment of the present invention.

FIG. 7 is a block diagram showing the construction of the encryption apparatus 400 in the third embodiment of the present invention. This encryption apparatus 400 is an apparatus for encrypting and transmitting a digital production 402 and is composed of a title key storage unit 401, a digital production 402, and amendment unit 403, a separating unit 404, an encryption module 405, and a combining unit 406.

The title key generation unit 401, the digital production 402, and the encryption module 405 are the same the title key generation unit 303, the digital production 304, and the encryption module 307 in the second embodiment and so will not be described.

The separating unit 404 can be composed of a latch circuit, and separates data to be encrypted (separated data 2) and the data not to be encrypted (separated data 1) from the block data "Data" extracted from the digital production 402. The separating unit 404 sends the separated data 1 to the amendment unit 403 and to the combining unit 406, and the separated data 2 to the encryption module 405.

The amendment unit 403 can be composed of a logical XOR circuit, and is used to calculate a logical XOR for each bit position in the title key Kt generated by the title key generation unit 401 and the separated data 1 sent from the separating unit 404. The amendment unit 403 then sends the obtained result to the encryption module 405 as the amended title key Kp shown by Equation (9) below.

$$Kp=Lt(+)Data1 \qquad \text{Equation (9)}$$

where the symbol (+) is an operator representing a logical XOR operation.

The encryption module 405 encrypts separated data 2 sent from the separating unit 404 using the amended title key Kp sent from the amendment unit 403 as the encryption key, and sends the obtained cryptogram E(Data2,Kp) to the combining unit 406. This cryptogram E(Data2,Kp) can be expressed by Equation 10 below, substituting Equation 9 above.

$$E(Data2,Kp)=E(Data2, Kt(+)Data1) \qquad \text{Equation (10)}$$

The combining unit 406 can be composed of a latch circuit, and, by combining the separated data 1 sent from the separating unit 404 and the cryptogram E (Data2,Kp) sent from the encryption module 405, outputs the encrypted block data "Edata" corresponding to the original block data "Data".

Figure 8:
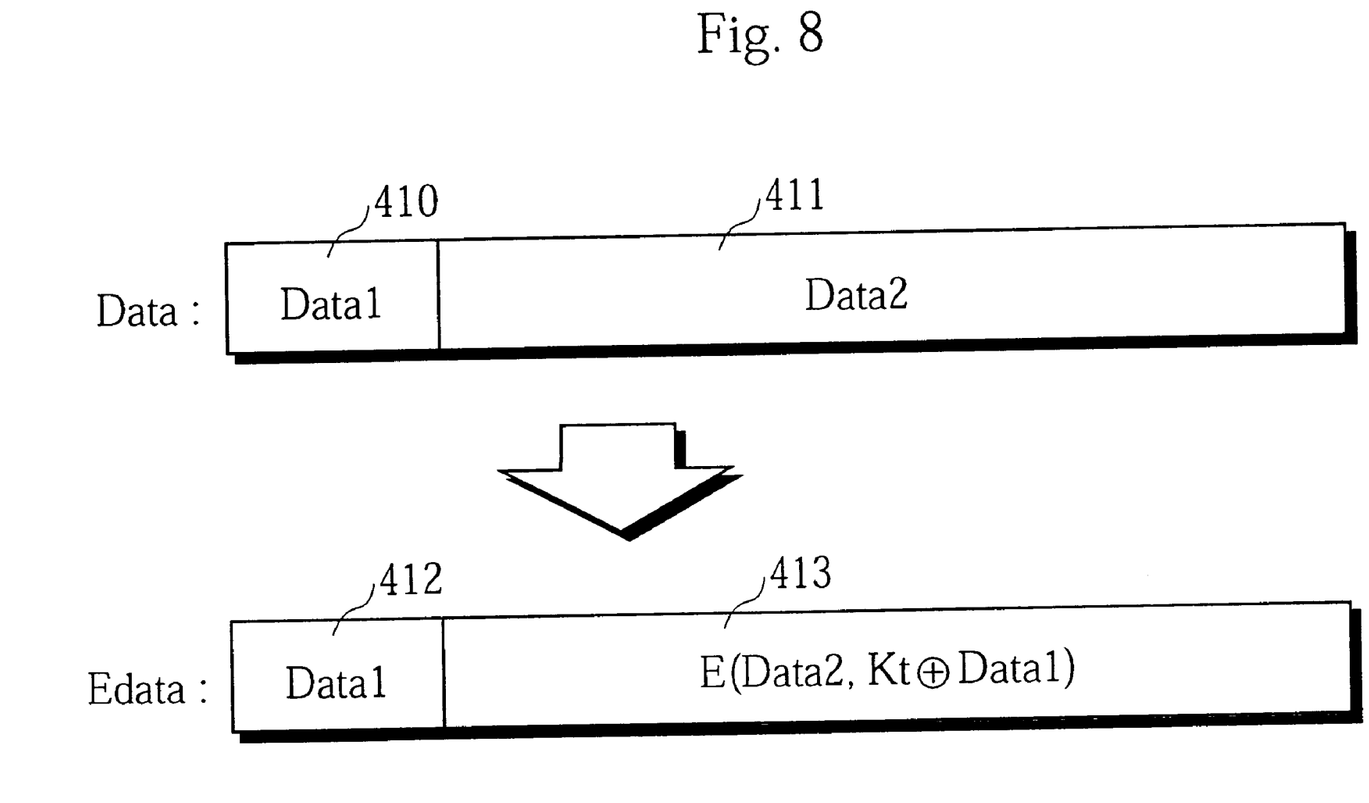
FIG. 8 shows the construction of the block data before encryption by the present encryption apparatus and the construction of the block data Edata after encryption by the present encryption apparatus.

FIG. 8 shows the construction of the block data "Data" before encryption and of the encrypted block data "Edata". As shown by FIG. 8, the separated data 1 is not changed, while the separated data 2 is encrypted using the title key Kp which has been amended by the separated data 1.

As described above, the present encryption apparatus 400 does not directly use a secret key as an encryption key, but instead amends the secret key and then uses it as the encryption key. This amendment is performed using a part of the digital production which is to be encrypted.

With the present encryption apparatus 400, the encryption key that is finally used in the encryption is determined based on the content (data to be communicated), so that it will be difficult for unauthorized third parties to work out the secret key. Here, it is also possible to avoid the worst possible scenario where a leak of the secret key enables the decrypting of all other contents.

Although the present invention has been fully described by way of examples with reference to accompanying drawings, it is to be noted that various changes and modification will be apparent to those skilled in the art. Therefore, unless such changes and modifications depart from the scope of the present invention, they should be construed as being included therein.

What is claimed is:

1. An encrypted communication system composed of n reception apparatuses and a single transmission apparatus for transferring digital information to the n reception apparatuses, wherein the n reception apparatuses are classified into m groups, and k secret keys selected from a total of m*k secret keys are exclusively distributed to each group, the transmission apparatus comprising:

secret key storage means for storing the m*k secret keys associated with the groups to which the secret keys are distributed;

secret key selecting means for selecting one secret key for each group out of the k secret keys which are stored in the secret key storage means corresponding to each group;

first encrypting means for encrypting a plaintext using each of the m secret keys read by the secret key selecting means to produce m type 1 cryptograms;

second encrypting means for generating a type 2 cryptogram that helps identify the m secret keys used by the first encrypting means; and transfer means for transferring m pairs that each include (1) one of the type 1 cryptograms, and (2) the type 2 cryptogram to the n reception apparatuses, each pair of one type 1 cryptogram and the type 2 cryptogram being transferred to every reception apparatus to which the secret key used to generate the type 1 cryptogram has been distributed, and each of the n reception apparatuses comprising:

secret key storage means for storing k secret keys that have been distributed to the group to which the reception apparatus belongs;

reception means for receiving a pair of a type 1 cryptogram and a type 2 cryptogram for the transmission apparatus;

first decrypting means for decrypting the received type 1 cryptogram using each of the k secret keys in the secret key storage means separately to generate k type 1 decrypted texts; and judging means for judging whether any of the k type 1 decrypted texts generated by the first decrypting means has predetermined relation with the type 2 cryptogram and, on judging that at last one type 1 decrypted text has the predetermined relation, confirming that the secret key used to generate the type 1 decrypted text that has the predetermined relation is identical to the secret key that was used to generate the type 1 cryptogram, wherein the type 2 cryptogram has a content that is unrelated to the m secret keys used by the first encrypting means, wherein the second encrypting means generates the type 2 cryptogram by encrypting the plaintext, wherein the judging means includes a second decrypting means for generating a type 2 decrypted text, judges whether any of the k type 1 decrypted texts matches the generated type 2 decrypted text, and when at least one of the k type 1 decrypted texts matches the type 2 decrypted text, confirms that the secret key used to generate the matching type 1 decrypted text is identical to the secret key that was used to generate the type 1 cryptogram, and wherein the second encrypting means encrypts the plaintext using the plaintext as an encryption key, and the second decrypting means decrypts the type 2 cryptogram separately using each of the type 1 decrypted tests as a decryption key.

2. A transmission apparatus for transferring digital information to n reception apparatuses, wherein the n reception apparatuses are classified into m groups, and k secret keys selected from a total of m*k secret keys are exclusively distributed to each group, comprising:

secret key storage means for storing the m*k secret keys associated with the groups to which the secret keys are distributed;

secret key selecting means for selecting one secret key for each group out of the k secret keys which are stored in the secret key storage means corresponding to each group;

first encrypting means for encrypting a plaintext using each of the m secret keys read by the secret key selecting means to produce m type 1 cryptograms;

second encrypting means for generating a type 2 cryptogram that helps identify the m secret keys used by the first encrypting means; and transfer means for transferring m pairs that each include
(1) one of the type 1 cryptograms, and
(2) the type 2 cryptogram
to the n reception apparatuses, each pair of one type 1 cryptogram and the type 2 cryptogram being transferred to every reception apparatus to which the secret key used to generate the type 1 cryptogram has been distributed, wherein the type 2 cryptogram has a content that is unrelated to the m secret keys used by the first encrypting means, wherein the second encrypting means generates the type 2 cryptogram by encrypting the plaintext, and wherein the second encrypting means encrypts the plaintext using the plaintext as an encryption key.

3. A reception apparatus for receiving digital information transferred from one transmission apparatus, comprising:

secret key storage means for storing k secret keys that have been distributed to the reception apparatus beforehand;

reception means for receiving a pair of a type 1 cryptogram and a type 2 cryptogram for the transmission apparatus;

first decrypting means for decrypting the received type 1 cryptogram using each of the k secret keys in the secret key storage means separately to generate k type 1 decrypted texts; and judging means for judging whether any of the k type 1 decrypted texts generated by the first decrypting means has a predetermined relation with the type 2 cryptogram and, on judging that at least one type 1 decrypted text has the predetermined relation, confirming that the secret key used to generate the type 1 decrypted text that has the predetermined relation is identical to a secret key that was used to generate the type 1 cryptogram, wherein the type 2 cryptogram has a content that is unrelated to the k secret keys, wherein the type 2 cryptogram is generated by encrypting a plaintext which was encrypted into the type 1 cryptogram, wherein the judging means includes a second decrypting means for generating a type 2 decrypted text, judges whether any of the k type 1 decrypted texts matches the generated type 2 decrypted text, and when at least one of the k type 1 decrypted texts matches the type 2 decrypted text, confirms that the secret key used to generate the matching type 1 decrypted text is identical to the secret key that was used to generate the type 1 cryptogram, and wherein the plaintext is encrypted using the plaintext as an encryption key, and the second decrypting means decrypts the type 2 cryptogram separately using each of the type 1 decrypted texts as a decryption key.

* * * * *